United States Patent
Moeller et al.

(10) Patent No.: US 8,163,833 B2
(45) Date of Patent: Apr. 24, 2012

(54) MELT ADHESIVE BASED ON METALLOCENE CATALYZED OLEFIN-α-OLEFIN COPOLYMERS

(75) Inventors: Thomas Moeller, Duesseldorf (DE); Volker Erb, Duesseldorf (DE); Marcus Heemann, Neuss (DE); Dirk Kasper, Duesseldorf (DE); Eckhard Puerkner, Duesseldorf (DE); Bernhard Herlfterkamp, Bottrop (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/040,405

(22) Filed: Mar. 4, 2011

(65) Prior Publication Data

US 2011/0213067 A1 Sep. 1, 2011

Related U.S. Application Data

(63) Continuation of application No. PCT/EP2009/061366, filed on Sep. 3, 2009.

(30) Foreign Application Priority Data

Sep. 5, 2008 (DE) .................. 10 2008 045 802

(51) Int. Cl.
  *C08L 53/00* (2006.01)
  *B05D 5/10* (2006.01)
(52) U.S. Cl. ................... 524/505; 427/208.4
(58) Field of Classification Search ............. 524/505
  See application file for complete search history.

(56) References Cited

U.S. PATENT DOCUMENTS

| | | | |
|---|---|---|---|
| 4,073,827 A | 2/1978 | Okasaka et al. | |
| 4,155,952 A | 5/1979 | McConnell et al. | |
| 4,299,933 A | 11/1981 | McConnell et al. | |
| 4,542,199 A | 9/1985 | Kaminsky | |
| 4,720,524 A | 1/1988 | Ohmae et al. | |
| 4,771,106 A | 9/1988 | Ohmae et al. | |
| 4,937,299 A | 6/1990 | Ewen et al. | |
| 5,189,192 A | 2/1993 | LaPointe et al. | |
| 5,272,236 A | 12/1993 | Lai et al. | |
| 5,278,272 A | 1/1994 | Lai et al. | |
| 5,349,100 A | 9/1994 | Mintz | |
| 5,352,649 A | 10/1994 | Shibahashi et al. | |
| 5,530,054 A * | 6/1996 | Tse et al. | 524/474 |
| 5,618,881 A | 4/1997 | Hojabr | |
| 5,665,800 A | 9/1997 | Lai et al. | |
| 5,783,638 A | 7/1998 | Lai et al. | |
| 6,462,132 B2 | 10/2002 | Willems et al. | |
| 6,774,183 B1 | 8/2004 | Palumbo et al. | |
| 2003/0153684 A1 | 8/2003 | Miller | |
| 2007/0042193 A1* | 2/2007 | Wang | 428/423.1 |
| 2007/0141373 A1* | 6/2007 | Sommerfeld et al. | 428/480 |
| 2009/0202847 A1* | 8/2009 | Eberhardt et al. | 428/457 |

FOREIGN PATENT DOCUMENTS

| | | |
|---|---|---|
| DE | 2006039833 | 3/2008 |
| EP | 0912646 | 11/2002 |
| WO | WO00/00565 | 1/2000 |
| WO | WO01/46277 | 6/2001 |
| WO | WO2005/090426 | 9/2005 |
| WO | WO2006/102150 | 9/2006 |
| WO | WO2006/114160 | 11/2006 |

OTHER PUBLICATIONS

ASTM-Methode E28-58T.
DIN 53018-1.
EN ISO 2555.
Arostegui, A. et al., Compatibilization of a Poly(butylenes terephthalate)/Poly(ethylene octane) Copolymer Blends with Different Amounts of an Epoxy Resin, *J. Appl. Polym. Sci.*, 2004, 91, 260-269.
Guerrero, C., et al., "Properties and Morphology of Poly(ethylene terephthalate) and High-Density Polyethylene Blends," *J. Appl Polym Sci.*, 2002, 82, 1382-1390.
Loyens, W., et al., "Rubber toughened semicrystalline PET: influence of the matrix properties and test temperature," *Polymer*, 2003, 44 (1), 123-136.
Loyens, W., et al., "Ultimate mechanical properties of rubber toughened semicrystalline PET at room temperature," *Polymer*, 2002, 43, 5679-5691.
Martin, P., et al., "Competitive reactions during compatibilization of blends of polybutyleneterephthalate with epoxide-containing rubber," *Polymer*, 2001, 42 (6), 2463-2478.
Martin P., et al. "Particle-in-particle morphology in reactively compatibilized poly(butylene terephthalate)/epoxide-containing rubber blends," *Polymer*, 2004, 45, 3277-3284.
Ohishi, H. "Phase Morphology and Compatibilization Mechanism in Ternary Polymer Blend Systems of Polyethylene Terephthalate, Polyolefin Rubber, and Ionomer," *J. Appl. Polym. Sci.*, 2004, 93, 1567-1576.
Pracella, P. et al., "Reactive Compatibilization of Blends of PET and PP Modified by GMA Grafting," *Macromol. Symp.*, 2003, 198, 161-171.
Kaloglou et al., Polymer, 36 (23), (1995), 4453-4462.
Korshak, V. V. and Vinogradova, S. V., Polyesters, Chapter III, pp. 72-150, Pergamon Press, N. Y., N. Y. (1965).
Papadopoulou et al., Polymer, 41 (7), (2000), 2543-2555.

* cited by examiner

*Primary Examiner* — Ling Choi
*Assistant Examiner* — Hui Chin
(74) *Attorney, Agent, or Firm* — James E. Piotrowski

(57) ABSTRACT

Melt adhesive containing 5 to 40 wt.-% of at least one ethylene-based copolymer and at least one $C_3$ to $C_{20}$-α-olefin obtained through metallocene-catalyzed polymerization, 10 to 65 wt.-% of at least one tackifying resin, 0 to 35 wt.-% of a plasticizer, 0.01 to 30 wt.-% additives and additional ingredients selected from stabilizers, adhesion promoters, fillers or pigments, waxes and/or other polymers, wherein the total should amount to 100%, characterized in that copolymer A is a block copolymer that exhibits a substantially even elastic behavior in the range of 0° C. to 25° C., measured as the ratio of the storage modulus E' according to $(E'_{0C} - E'_{25C})/E'_{25C} < 1.5$.

17 Claims, No Drawings

MELT ADHESIVE BASED ON METALLOCENE CATALYZED OLEFIN-α-OLEFIN COPOLYMERS

This application is a continuation of International Application No. PCT/EP2009/061366, filed Sep. 3, 2009 and published on Mar. 11, 2010 as WO 2010/026172, which claims the benefit of German Patent Application No. 10 2008 045 802.3 filed Sep. 5, 2008, the contents of each of which are incorporated herein by reference in their entirety.

The invention relates to hot melt adhesives manufactured on the basis of metallocene-catalyzed $C_2/C_3$/α-olefin copolymers having a block structure, which with additional auxiliaries afford hot melt adhesives having novel mechanical properties. Furthermore, suitable hot melt adhesives for particular fields of application are described.

Hot melt adhesives that are suitable for adhesively bonding the most diverse materials are widely known. In EP 0 912 646, hot melt adhesives are described that are manufactured from an essentially linear copolymer of ethylene together with at least one $C_3$ to $C_{20}$ α-olefin monomer. WO 00/00565 also describes hot melt adhesives that are manufactured on the basis of linear α-olefin copolymers. The usual auxiliary components are described therein, e.g. tackifying resins, waxes, additional different polymers, styrene block copolymers, plasticizers or other additives. The adhesive bonding of paper and cardboard materials is described as an intended use as well as the use as an adhesive tape or for book-binding. Block copolymers are not described.

Metallocene-catalyzed $C_3$ α-olefin polymers are likewise described in WO 2001/46277. They were formulated together with various auxiliaries, as already listed in the previous paragraph, into various adhesives. No information was given on the distribution of the monomers in the polymers, it concerned statistical distributions.

Adhesives based on selected $C_2$ α-olefin copolymers are described in WO 2006/102150. These copolymers and their manufacture are also described for example in WO 2005/090426. Specific catalysts and shuttling agents are mentioned in this regard. In addition to other products, adhesives are also described. Here it is noted, however, that the composition of the ingredients of the adhesive, its properties and its specific applications are only given in the form of lists, enumerations and refer to the problem without providing a solution. A specific disclosure is not given. Various general properties are described, especially the viscosity. Mention is made that block copolymers can also be considered.

Hot melt adhesives can be manufactured from the known olefin copolymers. These afford good adhesion even at elevated temperatures. However, it has been shown that for many types of use the low temperature properties have to be adapted. An essentially constant trend in properties at temperatures close to room temperature is particularly important. This allows rapid and consistent adhesive bonding to be achieved under industrial conditions.

For this reason the object of the present invention is to provide hot melt adhesives that exhibit particular industrially applicable properties. The hot melt adhesive should have a low viscosity so as to permit a facile application, in particular its mechanical properties should remain as constant as possible in the temperature range up to 50° C. In particular, the elastic behavior, which influences the cohesion of the adhesive, should be as linear as possible or held constant.

The object is achieved in that a hot melt adhesive is provided, comprising
a) 5 to 40 wt. % of at least one copolymer based on ethylene and at least one $C_3$ to $C_{20}$ α-olefin which is obtainable by metallocene-catalyzed polymerization,
b) 10 to 65 wt. % of at least one tackifying resin,
c) 0 to 35 wt. % of a plasticizer
d) 0.01 to 30 wt. % of additives and auxiliaries selected from stabilizers, adhesion promoters, fillers or pigments, waxes and/or other polymers, wherein the sum should be 100%, wherein the copolymer is a block copolymer that shows an essentially linear elastic behavior from −10° C. to 50° C., measured as the ratio of the storage modulus E' according to $(E'_{0C}-E'_{25C})/E'_{25C}<1.5$.

Another subject matter of the invention is the use of such hot melt adhesives for the adhesive bonding of substrates in the form of films. Another subject matter of the invention is the manufacture of hot melt adhesives for use as sprayable hot melt adhesives. Another subject matter of the invention is the manufacture of hot melt contact adhesives that after the application additionally comprise crosslinkable components.

Olefin copolymers based on ethylene and at least one $C_3$ to $C_{20}$ α-olefin are a necessary component of the adhesive. These copolymers are manufactured by metallocene catalysis. One embodiment of the invention uses such co- or terpolymers based on ethylene together with $C_4$ to $C_{20}$ α-olefins. The monomers that can be additionally added to the ethylene or propylene are the olefinic unsaturated monomers known to be copolymerizable with ethylene or propylene. They particularly concern linear or branched $C_4$ to $C_{20}$ α-olefins, such as butene, hexene, methylpentene, octene, cyclic unsaturated compounds like norbornene or norbornadiene; symmetrically or unsymmetrically substituted ethylene derivatives, wherein $C_1$ to $C_{12}$ alkyl groups are suitable substituents; as well as unsaturated carboxylic acids or carboxylic acid anhydrides. Here, they can be homopolymers, copolymers, terpolymers which can also comprise further monomers. In the following, copolymers should also be understood to mean those polymers of more than 2 monomers. In this case the amount of α-olefin comonomers should be less than 20%.

Another embodiment comprises copolymers based on ethylene and propylene. It is possible for additional minor amounts of $C_4$ to $C_{20}$ α-olefins to also be optionally comprised. They are likewise manufactured by metallocene catalysts. In this regard the fraction of propylene should be above 60 wt. %, in particular the fraction of propylene should be above 70 wt. %. Minor amounts of other α-olefin monomers can optionally be comprised, the amounts being less than 5%, however ethylene/propylene block copolymers are particularly suitable.

The molecular weight of the copolymer is preferably less than 200 000 g/mol, especially less than 100 000 g/mol. The lower limit is 2000 g/mol, preferably 5000 g/mol, (number average, $M_N$, measured by GPC). These (co)polymers are characterized in that they have a narrow molecular weight distribution. The molecular weight distribution, expressed as $M_N/M_W$, should be 2.5 for example, especially less than 2.3. Polymers of this type are known in the literature and can be commercially obtained from various manufacturers. Exemplary suitable polymers are commercially available under the trade names Vistamaxx or Infuse.

The suitable copolymers according to the invention are block copolymers. In this regard the blocks possess a different monomer composition. In one embodiment the inventively suitable hot melt adhesives possess one glass transition temperature; in another embodiment the copolymers should possess two glass transition temperatures. The first glass transition temperature ($T_g$) (measured by DTA) should be in the range between −100 to 0° C., especially between −80 to −10° C. The second glass transition temperature should be in particular below −100° C.

Another necessary property for the hot melt adhesives to be suitable according to the invention is the linear elastic behavior of the copolymers. This should remain essentially constant over the range −10 up to 50° C. In particular, this behavior should be defined between 0 and 25° C. The elastic behavior is measured as the ratio of the storage modulus E', as $E'_{0°C}-E'_{25C}/E'_{25C}<1.5$. In particular, the ratio of the storage modulus should be less than 1.3; in a preferred embodiment the copolymers according to the invention or their mixtures should exhibit a ratio of the storage modulus of <1.0. The elastic behavior of the copolymer should, expressed in a logarithmic scale, (lg E' as a function of T), in a particular embodiment remain essentially linear and constant. In particular, the function can be approximately a straight line with a slope (absolute value) of less than 0.5. Polymers that have a similar structure but a different storage modulus evolution, are not suitable for manufacturing adhesives according to the invention.

The copolymers that are suitable for the hot melt adhesive according to the invention can be employed singly, but it is also possible to employ a plurality, particularly two copolymers, together. In such a case the copolymers must be compatible. For example, mixtures of ethylene/propylene copolymers and ethylene/$C_4$ to $C_{12}$ α-olefin copolymers can be employed.

A hot melt adhesive according to the invention additionally comprises at least one resin. The resin should render the base polymer tacky. It is generally added in an amount of 10 to 65 wt. %, especially 25 to 60 wt. %.

In principle, the known resins, such as for example aromatic, aliphatic or cycloaliphatic hydrocarbon resins can be employed, as well as modified or hydrogenated naturally-occurring resins. Suitable resins that can be utilized in the context of the invention are e.g. terpene resins, such as terpolymers or copolymers of terpene, modified naturally-occurring resin acids from balsamic resin, tall oil resin or wood rosin, optionally also hydroabietyl alcohol and its esters, copolymers of acrylic acid, such as styrene-acrylic acid copolymers or copolymers of ethylene, acrylate esters and maleic anhydride, or resins based on functional hydrocarbon resins. Low molecular weight reaction products that consist of the abovementioned ethylene/propylene-α-olefin polymers, can also be employed as the tackifying resin. The molecular weight of such polymers is mainly below 2000 g/mol.

In particular this concerns resins with a softening point of 80° C. to 130° C. (ASTM Method E28-58T). Hydrocarbon resins are particularly preferred resins. Another particular embodiment employs resins with a softening point of less than 50° C.; in particular they can also be liquids.

Plasticizers are another inventively important ingredient. Exemplary suitable plasticizers are medicinal white oils, naphthenic mineral oils, oligomers of polypropylene, polybutene, polyisoprene, oligomers of hydrogenated polyisoprene and/or polybutadiene, benzoate esters, phthalates, adipates, vegetal or animal oils and derivatives thereof. Hydrogenated plasticizers are selected for example from the group of the paraffinic hydrocarbon oils. Polypropylene glycol and polybutylene glycol as well as polymethylene glycol are also suitable. Esters are also employed as the plasticizers, e.g. liquid polyesters and glycerin esters. In this case the molecular weight of polyalkylene glycols or polybutylene oligomers should be from 200 to 6000 g/mol; polyolefins should have a molecular weight of up to about 2000 g/mol, especially up to 1000 g/mol. White oils, mineral oils, polybutenes and liquid or pasty hydrogenated hydrocarbons are particularly suitable.

The amount of the plasticizer should be between 0 to 35 wt. %. In this regard, a high amount of plasticizers affords adhesives having low cohesive properties. The amount of the plasticizer should be particularly between 2 and 30%; in a particular embodiment, between 5 and 15 wt. %.

Waxes in amounts of 0 to 30 wt. %, preferably 0.5 to about 5 wt. %, can optionally be added to the hot melt adhesive. The quantity is gauged here so that, on the one hand, the viscosity is reduced to the required range and, on the other hand, the adhesion is not adversely affected. The wax can be of natural or synthetic origin and can optionally also be in chemically modified form. Suitable natural waxes that can be employed are vegetal waxes, animal waxes, or mineral waxes or petrochemical waxes. Suitable chemically modified waxes are hard waxes, such as Montan ester waxes, Sasol waxes, etc. Suitable synthetic waxes are polyalkylene waxes and polyethylene glycol waxes. Petrochemical waxes are preferably added such as petrolatum, paraffin waxes, microcrystalline waxes as well as synthetic waxes.

The hot melt adhesives can comprise, in addition to the above cited ingredients, still further ingredients that are usually employed as additives in hot melt adhesives. These include for example stabilizers, adhesion promoters, antioxidants, fillers and/or pigments. This enables certain properties of the adhesive to be influenced such as e.g. cohesion, stability, adhesion or tensile strength. The amount of additives and auxiliaries should be 0.01 to 30 wt. %, especially 0.1 to 15 wt. %.

Additives, such as stabilizers or adhesion promoters, are known to the person skilled in the art. They are commercial products and the person skilled in the art can choose them as a function of the required properties. Care should be taken that they are compatible with the polymer mixture.

The hot melt adhesive according to the invention can comprise as optional ingredients 0 to 15 wt. % of additional polymers that are different from the copolymers according to the invention. In particular, the amount of these polymers should be less than the inventively required amounts of the block copolymers according to the invention. These polymers can improve various end use properties of the hot melt adhesive, e.g. heat deformation resistance, low temperature flexibility, cohesion and adhesion of the applied adhesive. These additional polymers should not possess any groups that crosslink under the conditions of manufacturing and storage.

These can be in particular rubbery block copolymers that comprise styrene and have a linear or radial structure, such as SIS, SBS, SIBS or preferably SEBS and SEPS. Further examples are solid polybutene or its copolymers, polymethyl vinyl ether, polymers as well as polyphenylene oxide and modifications thereof. In this regard, these additional polymers should be solid at room temperature and able to be homogenously mixed with the hot melt adhesive. A microphase structure is not to be excluded in this case In another embodiment, the hot melt adhesive can additionally comprise at least one elastic polymer based on olefins and (meth)acrylic acid esters which possesses carboxyl groups and/or anhydride groups. The olefin monomers can be selected from the known $C_2$ to $C_5$ olefins, especially ethylene or propylene. The (meth)acrylic acid esters are selected from (meth)acrylate esters with low molecular weight $C_1$ to $C_8$ alkanols; methyl(meth)acrylate, ethyl (meth)acrylate, propyl (meth)acrylate, butyl(meth)acrylate or 2-ethythexyl (meth) acrylate in particular being suitable singly or in a mixture. The copolymer must also possess carboxyl groups and/or anhydride groups. This can result from polymerization with appropriate functional monomers or by subsequent modification of the polyolefin copolymer. It is possible for example to introduce COOH groups by oxidation. Furthermore, it is possible to introduce COOH or anhydride groups into the polymer by means of free radical grafting reactions, for example with maleic anhydride.

This polymer usually has a molecular weight (Mn) between 3000 and 50 000 g/mol, especially 8000 to 25 000 g/mol. The number of the COOH/anhydride groups should be in the range between 1 to 100 mg KOH/g, especially between 5 to 50 mg KOH/g. If the number of carboxyl groups is high, then the compatibility of the components of the hot melt adhesive is problematic. Moreover, the softening point should be from 50° C. to 150° C., especially from 90 to 110° C. The amount of the COOH group-containing polymer should be between 0 and 15 wt. %, especially between 0.5 and 10 wt. %. Suitable carboxyl group-containing polymers are commercially available and known to the person skilled in the art.

Ethylene/propylene copolymers are a further example of elastic polymers. They are known statistical copolymers. In particular, they can also be elastic polymers.

Whereas the elastic polymers influence the flexibility of the hot melt adhesive, the cohesion can be improved by portions of additional, non-flexible thermoplastic polymers. The known thermoplastic polymers, such as EVA, high molecular weight polyolefins, such as poly-1-butene, are especially suitable.

Fillers, for example can also be employed in concentrations of 0 to 10 wt. % in order to improve the end use and adhesion properties. Examples can be colorants or fillers, such as titanium dioxide, zinc oxide, gypsum, barytes, clay, chalk and the like.

The hot melt adhesive is manufactured by means of known melt-blending processes. In this regard, all the components can be heated together at the same time and then homogenized, or the lower melting components can be mixed and then the additional resin components added. It is also possible to manufacture the hot melt adhesive in an extruder in a continuous process. The suitable hot melt adhesive is solid and, apart from impurities, free of solvents.

The viscosity of the inventively suitable hot melt adhesive should be from 500 to 30 000 mPas, preferably from 500 to 10 000, especially from 1000 to 6000 mPas, measured at the application temperature. This is between 140 to 190° C. (Brookfield, EN ISO 2555, measured at the stated temperature).

The hot melt adhesive according to the invention can be easily designed to suit various applications. In a particular application, the hot melt adhesive is employed for a spray application. Here, especially paraffinic or naphthenic based mineral oils, polybutenes or hydrogenated hydrocarbons are employed as a plasticizer. The viscosity of these plasticizers should be between 25 and 300 mPas, especially between 100 and 250 mPas, measured at 20° C. In this embodiment, the viscosity of the hot melt adhesive is from 500 to 6000 mPas, especially between 700 and 2000 mPas, measured at temperatures between 120 and 160° C.

Furthermore, a correspondingly suitable sprayable hot melt adhesive is characterized by a viscosity that is only slightly dependent on the shear rate. In particular, the suitable hot melt adhesives of this embodiment demonstrate an essentially Newtonian flow behaviour that varies only slightly, especially less than ±15%, as a function of shear rates between 0 and 250 s$^{-1}$.

Another embodiment of a hot melt adhesive according to the invention is particularly suitable for adhesively bonding elastomeric composite films. Elastomeric backing layer films that are for example based on styrene block copolymers, polyurethane, polyesters, polyether block copolymers or polyolefins, can be manufactured as the backing layer for a composite manufactured according to the invention. Films of styrene block copolymers are especially known, for example styrene-isoprene-styrene, styrene-butadiene-styrene, styrene-ethylene block copolymers, polyethylene and copolymers, polypropylene and copolymers as well as polyethylene $C_3$ to $C_{12}$ α-olefin copolymers.

In this regard the films can principally consist of one of these polymers, although it is also possible to employ mixtures of other polymers mentioned above.

The backing films are characterized by an elastic deformation, i.e. after elongation in one direction, the films recover when the load is removed. The elongation here should be at least 100%, especially 200% of the initial length. After the recovery there should remain a maximum deformation of 50% of the original length, preferably less than 20%, especially less than 10%. The thickness of the films can be from 5 to 75 μm, especially 10 to 50 μm.

Thin nonwoven layers can be the second coating material that is intended to be glued on one or both sides of the film. Nonwovens of this type are sheet like structures that are flexible. They are manufactured by plaiting textile fibers, for example by spunbonding or by spunlacing. Such nonwovens are highly flexible and moreover are permeable to gases and liquids. The fibers or filaments used for the nonwovens generally consist of polypropylene, polyethylene, polyester or viscose. Such nonwovens are characterized by a high flexibility and in general they can also be stretched. Such nonwovens are known to the person skilled in the art and can be chosen as a function of the end use properties, for example the layer thickness.

Furthermore it is possible that flexible films can also be adhesively bonded as additional layers with the backing film in the adhesive bonding carried out according to the invention. These films concern flexible films that should not, however, exhibit any stickiness on their surface. They can consist of the known polymers, already listed above. Optionally it is also possible to adhesively bond the base film on one side with a nonwoven, and on the other side with a film. Optionally, additional layers can also be bonded to multi-ply composite materials.

The layer thickness of the applied adhesive ranges for example from 2 to 30 g/m$^2$ (ca. 2 to 30 μm). The layer thickness is particularly intended to be less than 10 g/m$^2$.

An inventively suitable adhesive should particularly comprise liquid or pasty plasticizers with good compatibility. They are for example medicinal white oils, naphthenic mineral oils, polypropylene-, polybutene-, polyisoprene oligomers, hydrogenated polyisoprene- and/or polybutadiene oligomers, paraffinic hydrocarbon oils. In this case the molecular weight of polyalkylene glycols or polybutylene oligomers should be from 200 to 6000 g/mol; polyolefins should have a molecular weight of up to about 2000 g/mol, especially up to 1000 g/mol. Polypropylene glycol and polybutylene glycol as well as polymethylene glycol are also suitable.

Furthermore, copolymers based on ethylene/propylene are particularly suitable in this embodiment. In this embodiment, 5 to 30 wt. % of elastic homopolymers or copolymers can be additionally comprised, selected from styrene block copolymers or ethylene-acrylic ester-MAH copolymers.

The base film for the adhesive bonding according to the invention is generally manufactured by extrusion. The inventively suitable hot melt adhesive is applied onto one side or both sides of this film. It can be coextruded through known flat dies or rollers, or applied by spraying. Immediately afterwards the additional layer to be bonded, for example a nonwoven layer, is applied on one or both sides. The three layers of material can be pressed together by means of mechanical pressure. A tear-resistant stable composite is obtained which can be subsequently rolled up, stored and further treated.

The application process depends on the type of the substrate to be adhesively bonded and the suitable machines therefor. The adhesive can be applied in spots, across the surface or in stripes. The application can occur through spray nozzles, by extrusion coating or by means of a cylinder coating system. It can also be carried out by coextrusion with the laminating films.

The hot melt adhesives according to the invention are used for adhesively bonding substrates, such as coated paper or cardboard, films, plastics or metallized, fat-repellent or painted surfaces. They are particularly suitable for adhesively bonding plastic surfaces made of polyethylene, polypropylene as a flexible film, as coated paper or paperboard, as a solid substrate, e.g. bottles or cans, or for aluminum coated surfaces. The hot melt adhesives according to the invention can be used for adhesively bonding multi-ply films, containers, such as folding boxes, shipping boxes, trays or for adhesively bonding to shaped substrates. In addition, plastic parts can be fixed on packaging with a hot melt adhesive according to the invention. For example, closures, spouts or other molded parts can be adhesively bonded to packaging. The adhesive bond serves for fixing, but can also seal up a bond seam.

A further form of use of the hot melt adhesives in accordance with the invention is the coating of self-adhesive wrappers, tapes or labels with an adhesive layer. Here, tapes or films, based for example on polyolefins or polyesters, are coated with the inventively suitable hot melt adhesive. In this case, a permanently sticky adhesive layer is obtained by choosing an appropriate adhesive. These materials can then be assembled. Permanent adhesive films, labels and tapes can be manufactured in this way. The resulting self-adhesive surfaces can optionally be covered with non-stick coated backing films.

The corresponding adhesively bonded products can be employed in many areas of application, for example as adhesive tapes or labels, multi-ply films or tamper-proof closures, packaging, hygiene products or in medical applications.

The invention is illustrated by means of the following examples:

The storage modulus E' is measured as follows:
Sample specimen: 5×10×2 mm

| Measuring instrument: DMA 242 C, | Netzsch Co. |
|---|---|
| Heating rate: 2 K/min | Dynamic force: 7 N |
| Frequency: 1 Hz | Amplitude: 50 μm |

The difference between the storage modulus at 0° C. and 25° C. is divided by the measured value at 25° C.: $E'_{0C}-E'_{25C}/E'_{25C}$ Affinity GA 1950: C2/C8 copolymer, $E'_{0C}-E'_{25C}/E'_{25C}=1.8$ (Dow)

Infuse D 9808.15: C2/C8 copolymer, $E'_{0C}-E'_{25C}/E'_{25C}=0.7$ (Dow) Vistamaxx VM 1120: C2/C3 copolymer, $E'_{0C}-E'_{25C}/E'_{25C}=0.8$ (Exxon)

EXAMPLE 1

| | |
|---|---|
| Affinity GA 1950 | 10.5% |
| Infuse D 9808.15 | 10% |
| Regalite S 1100 (Eastman Co.), resin | 55% |
| Nyflex 222 B (Nynas Co.), plasticizer | 24% |
| Irganox 1010 (Ciba), stabilizer | 0.5% |

This adhesive is particularly suitable for adhesively bonding elastic laminates. A film of styrene block copolymer is sprayed with the adhesive with a thickness layer of 10 μm. A nonwoven is then immediately applied. The back side is adhesively bonded in the same manner and the composite is compressed for a short time. After cooling, the composite is elastically bonded and after stretching regains its shape. No delamination was observed.

EXAMPLE 2

| | |
|---|---|
| Vistamaxx VM 1120 | 25% |
| Regalite S 1100 (Eastman Co.), resin | 53% |
| Priomol 352 (Exxon), plasticizer | 20% |
| Licocene PP 6102, wax | 1% |
| Irganox 1010 (Ciba), stabilizer | 0.5% |

The ingredients are mixed at 160° C. until a homogenous formulation results.

At 140° C. an adhesive according to example 2 was sprayed onto a 25 μm OPP film (orientated polypropylene). The spray pattern is neat and without stringiness.

EXAMPLE 3

| | |
|---|---|
| Affinity GA 1950 | 6.5% |
| Infuse D 9808.15 | 19% |
| Regalite S 1100 (Eastman Co.) | 53% |
| Nyflex 222 B (Nynas Co.), | 21% |
| Irganox 1010 (Ciba), | 0.5% |

EXAMPLE 4

| | |
|---|---|
| Affinity GA 1950 | 8% |
| Vistamaxx VM 1120 | 12% |
| Regalite S 1100 (Eastman Co.), | 53% |
| Nyflex 222 B (Nynas Co.), | 26.5% |
| Irganox 1010 (Ciba) | 0.5% |

The ingredients are mixed at 160° C. until a homogenous formulation results.

At 140° C. an adhesive according to example 4 was coated with a doctor blade onto a polyethylene film label. The quantity was 15 g/m². The sticky layer is covered over with a non-stick coated paper. Once the protective layer has been removed, the label can be adhesively bonded to a PET bottle.

EXAMPLE 5

| Exact 8230 (Exxon) | 45% |
| Vistamaxx VM 2330 | 6% |
| Kraton GX 1726 | 2% |
| Regalite S 1100 (Eastman Co.), | 40% |
| Vistanex PAR 950 (Exxon) | 5.5% |
| Licocene PP 6102 | 2% |
| Irganox 1010 (Ciba) | 0.5% |

The ingredients are mixed at 160° C. until a homogenous formulation results.

The molten adhesive can be applied onto a PE plastic substrate (polyethylene) and then immediately adhered to a cardboard packaging.

The invention claimed is:

1. A hot melt, pressure sensitive adhesive, comprising
   a) 5 to 40 wt. % of at least one copolymer based on ethylene and at least one $C_4$ to $C_{20}$ α-olefin which is obtained by metallocene-catalyzed polymerization,
   b) 10 to 65 wt. % of at least one tackifying resin,
   c) 0 to 35 wt. % of a plasticizer,
   d) 0.01 to 30 wt. % of additives and auxiliaries selected from stabilizers, adhesion promoters, fillers or pigments, waxes and/or other polymers,
   wherein the sum should be 100%, wherein the copolymer is a block copolymer that shows an essentially linear elastic behavior from 0° C. to 25° C., measured as the ratio of the storage modulus E' according to $(E'_{0C}-E'_{25C})/E'_{25C}<1.5$.

2. The hot melt adhesive according to claim 1, wherein the glass transition temperature (Tg) of the copolymer is below 0° C. and the melting point of the copolymer is above 30° C.

3. The hot melt adhesive according to claim 1, wherein the copolymer is selected from polymers based on ethylene with $C_4$ to $C_{12}$ α-olefins.

4. The hot melt adhesive according to claim 1, wherein the copolymer has a ratio of the elastic modulus of $(E'_{0C}-E'_{25C})/E'_{25C}<1.0$.

5. The hot melt adhesive according to claim 1, wherein the copolymer has a polydispersity $(M_w/M_n)$ of less than 2.5.

6. The hot melt adhesive according to claim 1, wherein the copolymer has two glass transition temperatures (Tg), wherein one Tg is below −100° C. and one Tg is between −100 and 0° C.

7. The hot melt adhesive according to claim 1, further comprising 5 to 30 wt. % of an ethylene/propylene copolymer.

8. The hot melt adhesive according to claim 1, comprising 5 to 30 wt. % plasticizer, selected from mineral oils, polybutene, liquid or pasty hydrogenated hydrocarbons or low molecular weight polyolefins.

9. The hot melt adhesive according to claim 1, comprising 0.5 to 20 wt. % of elastic copolymers as the auxiliary, selected from styrene block copolymers, statistical C2/C3 copolymers or ethylene-acrylic ester-MAH copolymers.

10. The hot melt adhesive according to claim 1, wherein the hot melt adhesive exhibits a viscosity between 500 and 20,000 mPas.

11. The hot melt adhesive according to claim 1, wherein the viscosity of the hot melt adhesive exhibits quasi-Newtonian flow behavior at 140° C.

12. An article comprising the hot melt adhesive according to claim 1 adhesively bonded to a rubbery-elastic substrate.

13. A method of applying the hot melt adhesive according to claim 1 comprising melting the adhesive and spraying the melted adhesive onto a substrate.

14. The hot melt adhesive according to claim 1, wherein the copolymer has an elastic behavior, expressed in a logarithmic scale, (lg E' as a function of T), with a slope (absolute value) of less than 0.5.

15. The hot melt adhesive according to claim 1, wherein the hot melt adhesive exhibits a viscosity between 500 to 5,000 mPas.

16. An article comprising the hot melt adhesive according to claim 1 adhesively bonded to a film, the film having an elastic elongation of more than 100%.

17. An article comprising a substrate coated with the hot melt adhesive according to claim 1.

* * * * *

UNITED STATES PATENT AND TRADEMARK OFFICE
CERTIFICATE OF CORRECTION

PATENT NO. : 8,163,833 B2
APPLICATION NO. : 13/040405
DATED : April 24, 2012
INVENTOR(S) : Thomas Moeller et al.

It is certified that error appears in the above-identified patent and that said Letters Patent is hereby corrected as shown below:

In the Specification

Column 4, Line 66: Change "2-ethythexyl" to -- 2-ethylhexyl --.

Column 7, Line 26: Change "multi-ply" to -- multiply --.

Signed and Sealed this
Thirteenth Day of March, 2018

Andrei Iancu
*Director of the United States Patent and Trademark Office*